April 28, 1953  S. C. VAHEY  2,636,750
CROSSBEAM ATTACHMENT FOR AUTOMOBILES
Original Filed May 10, 1949

*INVENTOR.*
Stanley C. Vahey
BY
Maurice A. Crews
*ATTORNEY*

Patented Apr. 28, 1953

2,636,750

UNITED STATES PATENT OFFICE 2,636,750

CROSSBEAM ATTACHMENT FOR AUTOMOBILES

Stanley C. Vahey, Detroit, Mich., assignor to The Budd Company, Philadelphia, Pa., a corporation of Pennsylvania Continuation of application Serial No. 92,362, May 10, 1949. This application December 12, 1950, Serial No. 200,415

5 Claims. (Cl. 280—106)

This is a continuation of the inventor's original application "Connection Between Longitudinal Sills and Transverse Wheel Supporting Beams of Automobiles," Serial No. 92,362, filed May 10, 1949, now abandoned.

The invention relates to a novel construction of the framework of an automobile and to the arrangement and connection of a cross or transverse beam. More specifically, the invention relates to a combined body and chassis structure connected with a transverse beam carrying a pair of road wheels.

The object of the invention is to overcome certain difficulties encountered in connecting transverse beams supporting motor and/or independently sprung steering wheels with longitudinal frame members of the body or chassis. The difficulties stem from the fact that said connections should be vibration-absorbing to keep noise and other vibration originating at the wheels or the motor away from the body, and that the sills as well as the beams should be arranged as low as possible and should be of simple configuration.

The aim of the invention also is to overcome certain further difficulties which stem from the necessity of having the lower margins of the body or frame crossed by the transverse beam, from the low arrangement of the body underside in modern cars, and from the desirability of easy and convenient removal or insertion of the cross beam as a unit with wheels, springs, etc. attached thereto.

The aims of the invention are achieved by a construction in which the body has a transversely extending downwardly open recess at the location of the transverse beam, and in which the lower edges of the recess are constructed for connection with such beam. The recess may be formed at least in part by an actual offset of the lower side margin of the framework and/or by a pair of projections or brackets extending downwardly beyond such margin.

In a specific form of the invention the outlined problems are solved by reducing the cross-sectional height of the wheel-supporting beam, at least where it crosses the undersides of the sill members, by recessing the longitudinal sill or frame members where they pass over the beam and by connecting the sills and the beam with the help of horizontally, preferably longitudinally arranged bolts and rubber bushings which pass, respectively, through the beam or parts connected therewith and through brackets projecting downwardly from the sills in front and in rear of the beam.

A more complete and clearer understanding of the above briefly outlined and of other objects, advantages and features of the invention will be gained from the following detailed description and from the illustration in the attached drawing of several embodiments.

Figure 1:
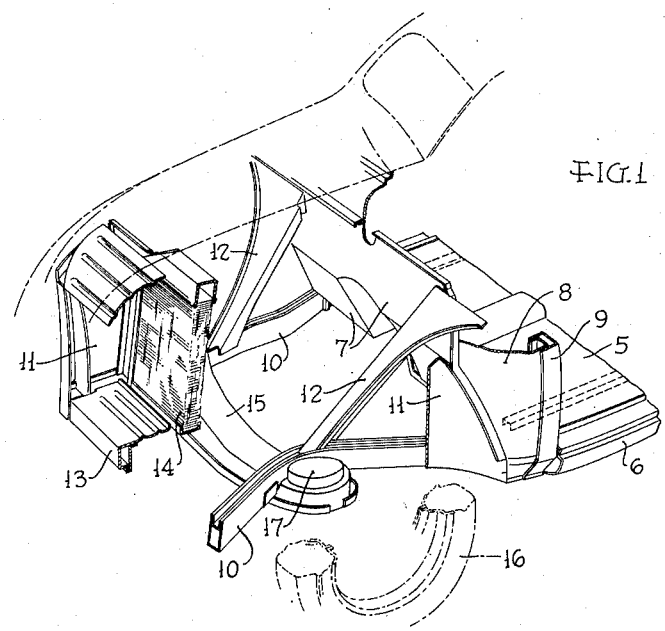
Figure 1 is a fragmentary diagrammatic three-quarter front perspective of the forward end of a self-supporting automobile body.
Figure 2:
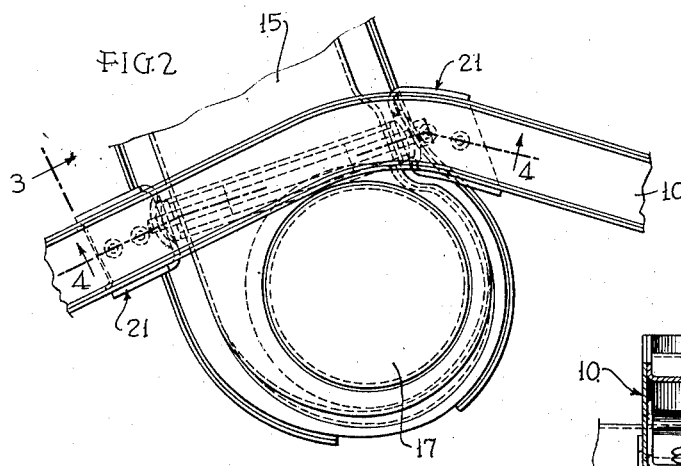
Figure 2 is a fragmentary plan view on a larger scale of one of the sill members and of the transverse beam at their crossing and connecting region.

The self-supporting automobile body, the forward end of which is shown fragmentarily in Figure 1, has a floor panel 5, threshold sills 6, a toe and dash panel 7, cowl sides 8, and front posts 9, all of which may consist of sheet metal and may be integrally connected with each other as by electric spot welding. Structurally secured to this structure are longitudinal sill members 10 which extend forwardly beyond the dashboard 7 and are braced by wheel housing aprons 11 and inclined structures 12. The sill members 10 have their forward ends connected by a structure 13 which constitutes the lower baffle for a radiator 14. Arranged beneath the sill members 10 is a box-sectional transverse beam 15 which carries the steering wheels 16 by swinging arms and coil springs, not shown, the springs having their upper ends arranged within the housings 17 provided at the ends of beam 15.

The general construction described so far is known and, therefore, needs no elaboration as to its details.

Figure 3:
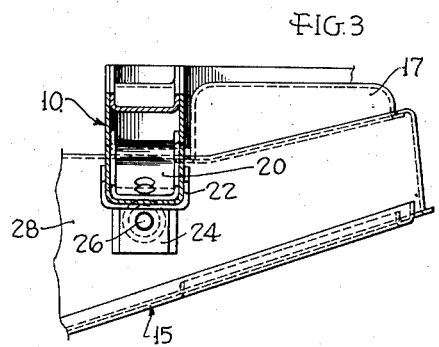
Figure 3 is a fragmentary section and front elevation of the structure shown in Figure 2, the section being taken along line 3—3 of Figure 2.
Figure 4:
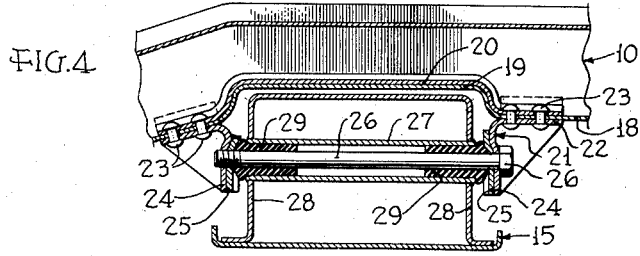
Figure 4 is a longitudinal fragmentary section along line 4—4 of Figure 2.

The vertical height of the beam 15 diminishes from the middle toward the end region adjoining the spring housing portions 17, as shown in Figure 3. Where the beam 15 crosses the box-sectional sill members 10, the latter have their bottom walls 18 upwardly offset at 19 and interiorly reinforced by an elongated member 20, the latter extending in both directions beyond the offset. An angle bracket 21 is arranged in front and in rear of offset 19 on each sill. Each of these brackets 21 has one channel-section arm 22 which embraces the lower part of sill member 10 and is secured to the bottom wall 18 and the reinforcing member 20 of the sill member, such as by rivets 23. The other arm 24 of each bracket extends downwardly and is reinforced by a member 25. A bolt or rod 26 extends in longitudinal direction through the arms 24 and reinforcements 25 of each pair of brackets and is removably held in position.

The mid-portion of each bolt extends, furthermore, through a sleeve 27 secured in holes in the side walls 28 of the beam 15, the sleeve 27 having a greater inner diameter than the outer diameter of bolt 26. Bushings 29, of rubber or other vibration-absorbing material, are fitted into the ends of sleeve 27 and surround the bolt 26. These bushings, furthermore, engage by their thickened ends the ends of sleeve 27 and the opposed surfaces of the members 25. The bushings 29 constitute the only direct connection between the beam 15 and the sill members 10 so that they bar the transfer of vibrations which may originate at the road wheels 16 or at the motor (not shown) having its front end supported on the beam 15.

The invention is not restricted to the details of the illustrated embodiment, but modifications will occur to those skilled in the art without departing from the spirit of the invention.

What is claimed is:

1. In an automobile structure, longitudinally extending, transversely spaced hollow-section sills and a transverse beam crossing said sills on the underside thereof, said beam having reduced height in the regions of the crossings with the sills, each sill having its underside upwardly offset at its crossing with said beam, the beam projecting party with its portion of reduced height into the recess of said sills, brackets on each sill having downwardly projecting portions in front and in rear of said beam, a bolt extending through said brackets on each sill and through the interior of said beam and engaging the latter by means of vibration-absorbing bushings.

2. In an automobile structure, longitudinally extending, transversely spaced hollow-section sills and a transverse beam crossing said sills on the underside thereof, each sill having its underside upwardly offset at its crossing with said beam and its lower wall interiorly reinforced by an elongated member extending in and adjacent the region of said offset, the beam projecting partly into the recesses of said sills, angle brackets secured by one of their arms to the undersides of said sills and said reinforcements and having their other arms arranged, respectively, in front and in rear of said beam and projecting downwardly, a rod extending through the arms of the brackets on each sill and through the interior of said beam, said rod engaging said beam by means of vibration-absorbing bushings.

3. Automobile structure, especially of the combined chassis and body type, said structure forming a downwardly open transverse recess defined fore and aft by upright parts of the structure, a transversely extending supporting beam projecting into said recess, means connecting both lower corners of said recess with said beam near both lateral sides of said structure, said means comprising inserts of resilient material.

4. Automobile structure, especially of the combined chassis and body type, said structure comprising longitudinal bottom sill members and a transversely extending supporting beam, a downwardly open transverse recess provided by said structure, said recess being formed at least in part by upward offsets of said sill members and having longitudinally spaced upright margins, said supporting beam projecting into said recess, means connecting both lower corners of said recess with the beam and comprising inserts of resilient material.

5. Automobile structure, especially of the combined chassis and body type, said structure comprising a transversely extending supporting beam, a downwardly open but longitudinally enclosed transverse recess provided by said structure, said recess being formed at least in part by brackets projecting downwardly from said structure, said supporting beam projecting into said recess, means connecting the lower corners of said recess with the beam and comprising inserts of resilient material.

STANLEY C. VAHEY.

References Cited in the file of this patent

UNITED STATES PATENTS

| Number | Name | Date |
|---|---|---|
| 2,048,953 | Sherman | July 28, 1936 |
| 2,301,593 | Ulrich | Nov. 10, 1942 |
| 2,611,625 | Kishline et al. | Sept. 23, 1952 |